United States Patent [19]
Hakansson

[11] 3,817,035
[45] June 18, 1974

[54] VALVE CONTROL MEANS FOR CHANGING WORKING SPACE VOLUME IN STIRLING CYCLE ENGINE

[75] Inventor: Sven Anders Samuel Hakansson, Malmo, Sweden

[73] Assignee: Kommanditbolaget United Stirling, Malmo, Sweden

[22] Filed: June 30, 1972

[21] Appl. No.: 267,976

[30] Foreign Application Priority Data
July 7, 1971 Great Britain.................. 31824/71

[52] U.S. Cl. ............................................. 60/521
[51] Int. Cl........ F03g 7/06, F25b 9/00, F01k 27/00
[58] Field of Search...................... 60/24, 516–524

[56] References Cited
UNITED STATES PATENTS

| | | | |
|---|---|---|---|
| 3,355,881 | 12/1967 | Brandes | 60/24 |
| 3,372,539 | 3/1968 | Reinhoudt | 60/24 |
| 3,397,533 | 8/1968 | Steiner et al. | 60/24 |
| 3,496,720 | 2/1970 | Neelen | 60/24 |
| 3,597,766 | 8/1971 | Buck | 60/24 X |

Primary Examiner—Edgar W. Geoghegan
Assistant Examiner—H. Burks
Attorney, Agent, or Firm—Laurence R. Brown

[57] ABSTRACT

In a Stirling cycle engine of the type having a plurality of dead volume chambers selectively coupled to the engine working space to change the effective volume thereof, valve control means for the dead volume chambers is provided comprising a non-return valve and a selectively opening valve both communicating between the dead volume chamber and the working space. The selectively opening valves are of a piston type working in a cylinder controlled by means of working pressures derived from minimum or maximum pressures in the working space.

5 Claims, 1 Drawing Figure

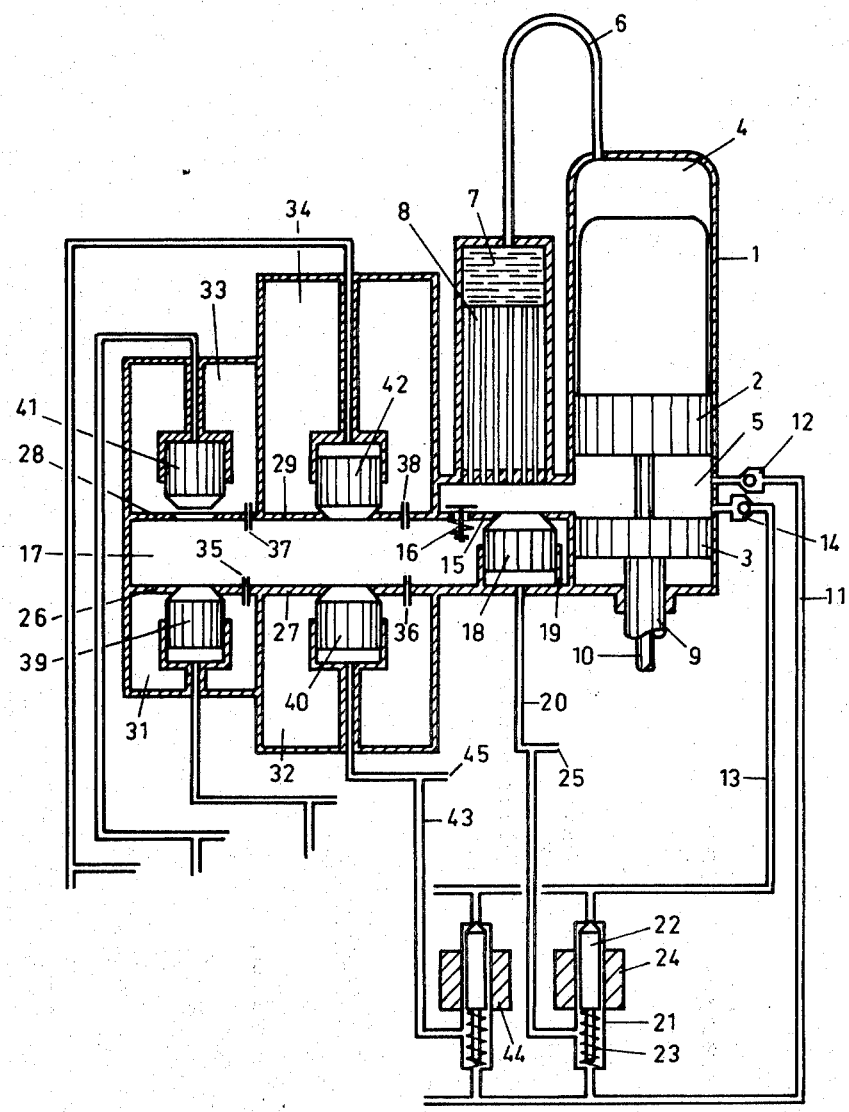

VALVE CONTROL MEANS FOR CHANGING WORKING SPACE VOLUME IN STIRLING CYCLE ENGINE

This invention relates to a Stirling cycle hot gas engine power-control system of the kind (herein called "the kind defined") comprising a plurality of dead volume chambers adapted to be selectively connected to the working chambers of the engine through a respective path which includes valve means operable for keeping said path fully open or for allowing gas to pass only in the direction towards said working chambers, said valve means comprising at least one non-return valve connected in parallel with a valve capable of opening said path for flow of gas in both directions.

Known systems of the kind defined have had the disadvantage that working gas could leak out of the engines through seals provided in connection with the valves included in the systems. Also the forces necessary for governing the valves are usually of substantial magnitude, thus making it necessary to provide servo-systems.

The present invention is intended to provide an improved power-control system of the kind defined in which the valves cannot cause any leak of gas and do not necessitate the provision of a separate servo-system for governing the valves.

According to the invention there is provided a system of the kind defined, wherein at least one said valve capable of opening said path for flow of gas in both directions is in the form of a valve piston working in a valve cylinder, the valve piston being capable of opening or closing said path and the interior space in the valve cylinder behind the valve piston being connected to a working chamber of the engine through one or the other of two conduits each containing a respective non-return valve, one of these return valves allowing flow of gas only from the valve cylinder to the said working chamber and the other of these non-return valves allowing flow of gas only from the said working chamber to the valve cylinder.

The scope of the monopoly sought is defined in the claims hereinafter, and how the invention may be put into practice is described in more detail with reference to the accompanying drawing, showing schematically a vertical section through a system according to the invention.

In the drawing a Stirling cycle hot gas engine cylinder 1 is provided with a displacer piston 2 and a working piston 3. The space 4 above the displacer piston 2 forms a high temperature working chamber and the space 5 between the two pistons 2 and 3 forms a lower temperature working chamber 5, the two chambers 4 and 5 being interconnected through a conduit containing several heater tubes 6, (only one of which is shown in the drawing) a regenerator 7 and a cooler 8.

The pistons 2 and 3 are connected through piston rods 9 and 10 to a drive mechanism (not shown) for an output shaft (not shown).

The low temperature working chamber 5 contains gas at an almost constant low temperature level, but the gas is of varying pressure during the Stirling cycle, for example the pressure may vary between 175 and 225 bars during each cycle.

A pipe 11 is connected to the working chamber 5 and contains a non-return valve 12 allowing flow of gas only in the direction from the working chamber 5 into the pipe 11. Thus the pressure in the pipe 11 will remain constant at a level of about 225 bars.

Another pipe 13 is connected to the working chamber 5 and contains a non-return valve 14 opening to allow flow of gas only in the opposite direction. Thus the pressure in the pipe 13 will remain constant at a level of about 175 bars.

A wall 15 limiting the working chamber 5 contains a non-return valve 16 allowing flow of gas only in the direction into the working chamber 5 from a dead volume chamber 17 adjacent to said wall 15. The wall 15 is also provided with an opening governed by a valve member 18. This valve member 18 is designed as a valve piston working in a valve cylinder 19 the interior of which is connected to a pipe 20 leading to a valve 21 containing outlets governed by a valve member 22. One of said outlets is connected to the pipe 20, another to the pipe 11 containing gas at maximum pressure, and the third to the pipe 13 containing gas at minimum pressure. The valve member 22 is normally urged by a spring 23 into a operative position in which the connection to the pipe 13 is closed.

However, the valve member 22 may be moved against the action of the spring 23 into a reverse operative position in which the connection to the pipe 11 is closed, a solenoid 24 urging the valve member 22 in this direction when energised.

A branch pipe 25 is connected to corresponding valves in other working chambers in case the Stirling engine is of multi-cylinder type.

The chamber 17 is limited by walls 26, 27, 28, 29 separating said chamber 17 from further dead volume chambers 31, 32, 33, 34. Each of said walls 26–29 is provided with a narrow respective opening 35–38 ensuring that the mean pressure in each chamber 31–34 is the same as the mean pressure in the chamber 17. Each wall 26–29 is also provided with an opening governed by a respective valve member 39–42. The said valve members are governed in the same way as the valve member 18. Thus it will be sufficient to repeat that each of the valve members may be selectively backed by a pressure which is either the minimum or the maximum pressure of the working gas, for example the valve member 40 may be exposed to the gas pressure in a pipe 43 governed by a solenoid 44. A branch pipe 45 leads to corresponding valves in other cylinders of the Stirling engine.

The described system will operate as follows:

In case the solenoid 24 is de-energised the valve member 22 will remain in the position shown, in which it keeps the connection from the valve 21 to the pipe 13 closed. The pipe 11 containing gas at maximum pressure is connected to the pipe 20 and thus the pressure behind the valve member 18 corresponds to the maximum pressure of the working gas. Due to the non-return valve 16 in the wall 15 the pressure in the chamber 17 will correspond to the minimum pressure of the working gas in the Stirling cycle. Due to the narrow openings 35–38 the pressure in the chambers 31–34 will also correspond to said minimum pressure. Consequently the Stirling engine will contain the maximum amount of gas in the active working chambers and the conduit containing the heater tubes 6, the regenerator 7 and the cooler 8.

In case the solenoid 24 is energised the valve member 22 will shut off the connection to the pipe 11 and open a connection between the pipe 13 containing gas of minimum pressure with the pipe 20. The valve member 18 is now moved away from the opening in the wall 15 and pressure varying as in the chamber 5 will occur in the chamber 17.

This varying pressure corresponds to the varying gas pressure in the Stirling cycle, but due to the volume of the chamber 17 the mean pressure level will have been lowered compared with the mean pressure prevailing in the Stirling cycle prior to the energising of the solenoid 24.

The pressure in each of the dead volume chambers 31, 32, 33, 34, will remain constant at a level corresponding to the new mean pressure in the Stirling cycle.

If the solenoid 44 is now energised the valve member 40 will be withdrawn from its opening in the wall 27. The mean pressure in the Stirling cycle is not affected by this opening, but the volume available to the gas in the cycle is increased. Thus withdrawing of the valve member 40 from its opening in the adjacent wall will cause a decrease in power output merely by increasing the dead volume available to the gas in the Stirling cycle. It will be understood that a corresponding effect will be obtained by energising one or more of the solenoids (not shown) governing the other valves 39, 41, 42 in the walls limiting the chamber 17.

It will be understood that the power-control system according to the invention and described above may easily be hermetically sealed and that any leakage in the valves will only permit gas to pass from one part of the system to another without losses to the exterior.

What we claim is:

1. A power control system for a Stirling cycle hot gas engine with at least one dead volume chamber selectively connectable through a connecting path to a working chamber of the engine and first valve means selectively operable to open said path in both directions and second valve means for opening said path only in the direction towards said working chamber, comprising in combination, wherein said first valve means comprises a valve piston working within a valve cylinder, a pair of conduit means containing respective non-return valves allowing gas to flow respectively to and from said working chamber, and means selectively connecting one of said conduit means to said cylinder to position said first valve means.

2. A power control system as defined in claim 1 with a wall having an aperture spaced between said dead volume chamber and said working chamber wherein said valve piston includes means to selectively open or close said aperture.

3. A power control system as defined in claim 1 wherein said second valve means is spring biased toward an open operative position.

4. A power control system as defined in claim 1 including at least one further dead volume chamber communicating with said at least one dead volume chamber, further valve piston means with a cylinder and being operable to open and close a path between said two chambers, and means selectively operating said further valve piston means independently of said first valve means thereby to allow gas to flow from a selected one of said conduits into the cylinder of said further valve piston means.

5. A power control system as defined in claim 4 with a restricted opening between said two chambers tending over a long time period to equalize pressure within the two chambers.

* * * * *